John M. Ketteringham
Amos J. Leffler
INVENTOR.

ENRICHMENT IN WATER VAPOR WHEN POROUS GLASS MEMBRANE IS PERMEATED BY HUMID OXYGEN

VARIATION IN AMOUNT OF WATER REMOVED WITH OUTGOING WATER VAPOR PARTIAL PRESSURE AT 70% R.H., 25°C

United States Patent Office 3,511,031
Patented May 12, 1970

3,511,031
APPARATUS FOR REMOVING WATER VAPOR FROM GASES
John M. Ketteringham, Belmont, Mass., and Amos J. Leffler, Broomall, Pa., assignors to Arthur D. Little, Inc., Cambridge, Mass., a corporation of Massachusetts
Filed Mar. 19, 1968, Ser. No. 714,266
Int. Cl. B01d 53/00
U.S. Cl. 55—158                                    11 Claims

ABSTRACT OF THE DISCLOSURE

An apparatus for removing water vapor from a gaseous medium. The water-containing mixture is contacted with the inlet side of a microporous membrane having a partial pressure differential of water vapor across it. The water condenses on the walls of the capillaries in the microporous membrane and then essentially fills them to block passage of any gaseous components. As the water continues to condense, it flows from the outlet side of the membrane. At relatively high humidities at ambient temperatures, water can be taken out without any appreciable loss of the gaseous components. The apparatus is particularly well suited for use in a cabin of a space vehicle.

---

The invention herein described was made in the course of or under a contract with the United States Air Force.

There are a number of instances wherein it is necessary to control the water vapor content of an enclosed atmosphere. For example, water vapor builds up in the cabin of a space craft, in submarines, in closed rooms, and in refrigerating equipment. It also accumulates in fuel cells, in some types of batteries and in carbon dioxide reduction systems. The present methods for removal of water vapor from enclosed spaces include cooling and condensation, interchanging of wet air for dry air, and adsorption on silica gel beds or the like.

The removal of water vapor from space vehicle atmospheres probably presents the most demanding requirements of a water vapor removal system because of the necessity to provide the maximum ability to remove water vapor in an apparatus which requires a minimum volume and weight. It will, therefore, be convenient to describe the apparatus of this invention in terms of removing water vapor from an enclosed space, such as the cabin of a spacecraft. It is, however, understood that the apparatus are equally suitable for many different situations and applications, among those previously listed.

At present, the removal of excess humidity from space vehicle atmospheres is accomplished either by cooling below the dew point to produce condensation or by the use of adsorbent silica gel beds. These methods have been found unsatisfactory for several reasons. Condensation through cooling requires a refrigeration system; and the subsequent removal of entrained droplets of water is difficult under weightless conditions. The use of silica gel beds requires that they be regenerated by application of heat, a vacuum or a combination of both heat and vacuum, a requirement which means added equipment and a large investment of power. Moreover, this method necessitates duplication of the beds so that one may be regenerated while the other one is removing water from the airstream. Thus, it is apparent that there is a need for a method and apparatus which will operate continuously at ambient temperatures and which does not have to be periodically regenerated.

It is, therefore, a primary object of this invention to provide an improved method of removing water vapor from gases, and particularly from oxygen-containing atmospheres. It is another object of this invention to provide an apparatus of the character described which is reliable and flexible as to its performance within a number of different situations. It is another primary object of this invention to provide an improved apparatus for removing water vapor from gases and particularly from oxygen-containing atmospheres, the apparatus being simple to construct, install, and maintain. It is another object of this invention to provide an apparatus of the character described which is sufficiently flexible to permit its being placed in the most convenient locations within an enclosure without disrupting the general design of the space or enclosure. It is another object of this invention to provide such apparatus which does not require auxiliary equipment such as heating or cooling means of condensing areas. It is still a further object of this invention to provide such apparatus which does not have to be furnished in duplicate but which is capable of functioning continuously such that it does not have to experience an on-off cycle for regeneration. Other objects of the invention will in part be obvious and will in part be apparent hereinafter.

The invention accordingly comprises the steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a plot of the change in flux with time at the discharge side of a membrane formed of carbon;

Figure 1:
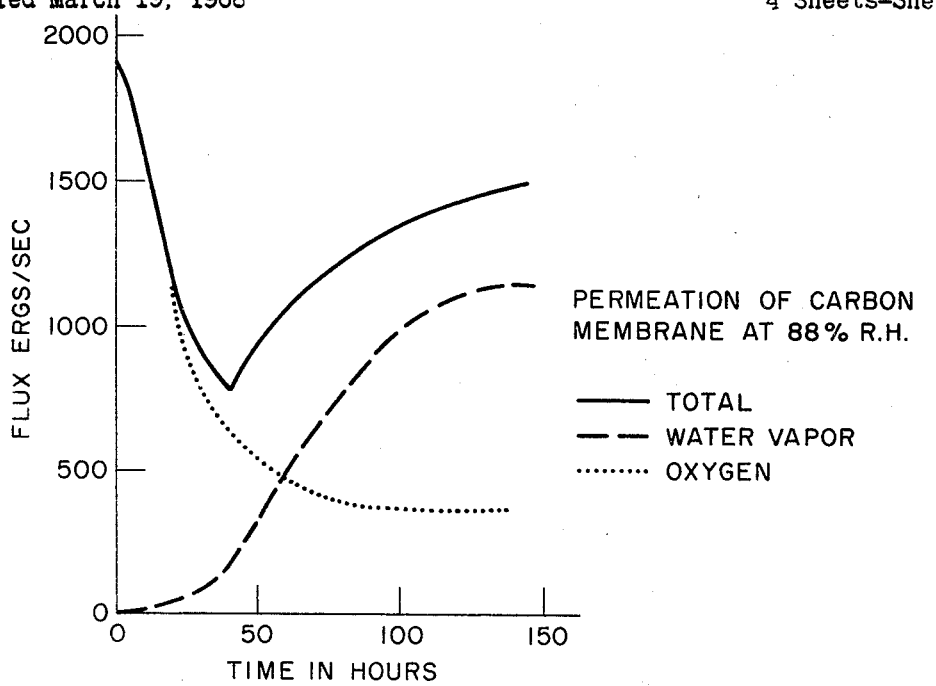

The method of this invention is based upon the separation of water vapor components from a gas/vapor mixture by condensing a portion of the water vapor in the pores of a microporous membrane wherein the pores are of capillary dimensions within a specified size range.

The mechanism by which effective separation of the water vapor component from a gas/vapor mixture is obtained may be briefly described as follows. When a mixture of two gases diffuses through a small capillary, the separation, according to Graham's law, is proportional to the ratio of the square roots of their molecular weights. However, the vapor component of a gas/vapor mixture is able to condense on the walls of the capillaries of a microporous membrane, and in the condensed state retains a high degree of mobility. The vapor then flows through the membrane in the condensed state which leads to higher enrichments than would be expected according to Graham's law. As the amount of vapor condensed on the wall increases, an even higher enrichment is obtained because the condensed vapor physically blocks the gas flow in the capillary. With even greater condensation, complete blocking of the pores can take place, and then the membrane becomes effectively semipermeable to the vapor component of the mixture. A small amount of gas will permeate the membrane even when the pores are completely blocked because of its solubility in the condensed vapor phase.

Thus, in the method and apparatus of this invention, the condensed water vapor moves through the membrane, while substantially all of the oxygen and other gases, e.g., helium, remain on the inet side of the membrane.

Moreover, when the surface of a liquid is curved such as when it is held in a thin film on a curved substrate or in a meniscus, its vapor pressure is lower than if its surface were flat. On a curved capillary wall, the radii of the surface are $r_1 = \bar{r}$ (the mean capillary radius) and $r_2 =$ infinity, whence $a = 2\bar{r}$, where $a$ is the equivalent capillary radius. Thus, for condensation to take place over and above normal sorption caused by heterogeneous molecular forces, the vapor pressure must be greater than $p_a$ according to the relation developed by Kelvin, $$\log_e \frac{p_0}{p_a} = \frac{\sigma M \cos \theta}{\rho R T \bar{r}}$$

where $p_0$ is the saturation vapor pressure of the bulk liquid at temperature T; $\sigma$ is the surface tension; $\theta$ is the contact angle; $\rho$ is the density; R is the universal gas constant; and M is the molecular weight. When the capillary is full of condensate, a new curved surface exists across the capillary, i.e., the meniscus and for the surface $a = \bar{r}$. Therefore, desorption from these small capillaries will only take place when the vapor pressure of the condensate is reduced below a value $p_d$ given by $$\log_e \frac{p_0}{p_d} = \frac{2\sigma M \cos \theta}{\rho R T \bar{r}}$$

from which can be deduced that $$\frac{p_d}{p_0} = \left(\frac{p_a}{p_0}\right)^2$$

Thus, the relative humidity for adsorption into capillaries is higher than the relative humidity for desorption from filled capillaries. Hence, this condition favors condensation of the water vapor in the capillaries and discourages desorption of the vapor from the capillaries once the capillaries are full of condensate.

For condensation of the water in a capillary, it can be assumed that the differential pressure from one end of the capillary to the other gives rise to a difference of capillary potential at each end of the capillary. Since viscous flow is most clearly envisaged by a difference of pressure, it is convenient to express the capillary potential as the negative pressure or tension P which must be applied to the bulk liquid to reduce its vapor pressure from its normal vapor pressure to that of the condensate. The difference in tension caused by capillary potential is often greater than the imposed differential pressure, thus enhancing hydraulic flow through the capillary. In the case of a spacecraft, this pressure differential is already present across the wall of the spacecraft and by incorporating the apparatus in a portion of the wall thereof, it is possible to create a sufficient pressure differential to insure continuous action of the microporous membrane. This will be shown in greater detail with regard to the description of FIGS. 6–9 representing typical embodiments of the apparatus of this invention.

In order to function properly as a microporous membrane in accordance with the teaching of this invention, the membrane must be formed of a material which is hydrophilic so that water vapor will condense within the capillaries. The porous material must also have a small mean pore size so that capillary lowering of vapor pressure brings about more condensation of the vapor component. It is necessary that there be no appreciable number of pores having diameters greater than 100 Angstrom units, since passages of this size would dominate the flow of water through the membrane and would not give semipermeable separations. Any limitations placed on the minimum pore diameter will be dictated by the practical problems of forming the pores and the actual dimensions of the water molecule, which is about 3 Angstrom units. Normally, the mean pore diameter will be at least 10 Angstrom units. A preferable mean pore diameter range is between about 20 and about 60 Angstrom units. It is also desirable that the mean pore size distribution in any one membrane system be fairly narrow. It is also desirable that the membrane have as high a degree of porosity which is consistent with other desired physical properties which include the requirement that it be continuous in porous structure, strong in relatively thin forms, and available in relatively large areas, as well as in contoured structures. In addition, the material must be one which is readily wet by water.

Membranes formed of pressed carbon have been used, and these are suitable as well as those formed of pressed silica gel and the like. However, a preferred microporous membrane is one which is constructed from porous glass, more particularly from a porous glass sold under the trade name of unshrunk Vycor by Corning Glass Works. This particular material is a porous form of glass which is chemically 96% silica, the remaining being substantially all boric oxide. This material is very hydrophilic and may be obtained in forms having mean pore diameters ranging from 20 to 60 Angstrom units. It may be formed into virtually any desired physical shape or configuration desired.

In order to evaluate the performance of a membrane suitable for the practice of this invention, an apparatus was devised by which oxygen gas having a predetermined controlled amount of water vapor was passed over a flat or through a tubular membrane under controlled and monitored conditions. The quantities of oxygen and of water vapor which permeated the membrane were measured. Characteristic data obtained in these evaluations are plotted in FIGS. 1–5 and tabulated below.

In one series of these evaluations, membranes in the form of a plug were used which had a flat circular surface, the area of which was one square centimeter. These plugs were two centimeters thick. The plugs were formed of compressed amorphous carbon powder (sold by Cabot Corporation under the trade name Carbolac) and of the porous unshrunk glass. These materials had mean pore diameters of about 60 Angstrom units. To evaluate a plug for the purpose it was mounted in a membrane holder which sealed off its sides and provided fluid-tight chamber means for applying a vacuum to the outgoing face. Suitable gas conduit means were in communication with the fluid-tight chamber associated with the ingoing face for withdrawing the drier outgoing gas; and means were provided to draw off the condensed water discharged from the outgoing face.

Figure 2:
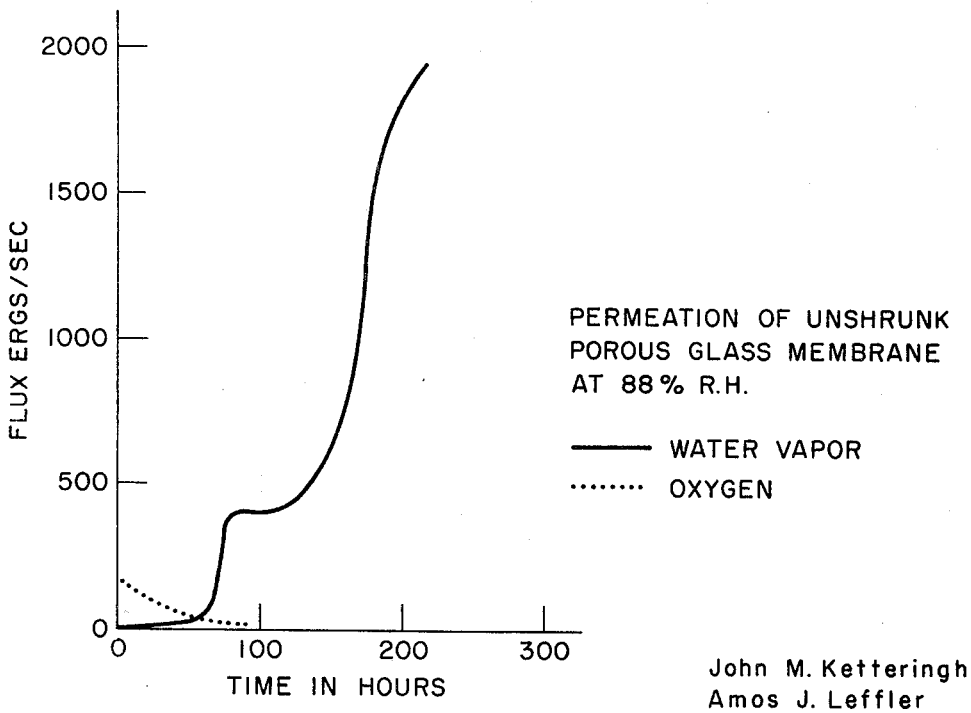
FIG. 2 is a plot of the change in flux with time at the discharge side of a membrane formed of an unshrunk porous glass membrane.

FIGS. 1 and 2 are plots of the amount of gas and vapor discharged from the outgoing faces of the plugs when air having 88% relative humidity was introduced into the test apparatus. A vacuum of less than 2 mm. Hg pressure was maintained on the outgoing surface. The amounts of gas and vapor making up the permeate are designated as "flux" in units of ergs./second. This in turn is defined as rate of pressure rise × volume, which is expressed as $$\frac{\text{dynes}}{\text{cm.}^2} \times \text{cm.}^3$$

e.g., dynes-cm. or ergs.

It will be seen from FIG. 1 that by using the pressed carbon membrane, it was possible to reach an operational point where water was removed at a fairly constant rate and the amount of oxygen which was discharged, although measurable, dropped to a fairly constant low rate. The porous glass membrane was much more effective, as seen in FIG. 2; for the amount of oxygen permeating the membrane dropped to essentially zero, while the amount of water which was condensed and discharged was sufficient to materially reduce the humidity of the outgoing air. It will be noted in FIG. 2 that there are two sharp breaks in the water vapor curve. The first of these is believed to be due to the establishment of condensed phase flow through the membrane and the second to the complete filling of the capillaries with water which establishes capillary driving forces.

Figure 3:
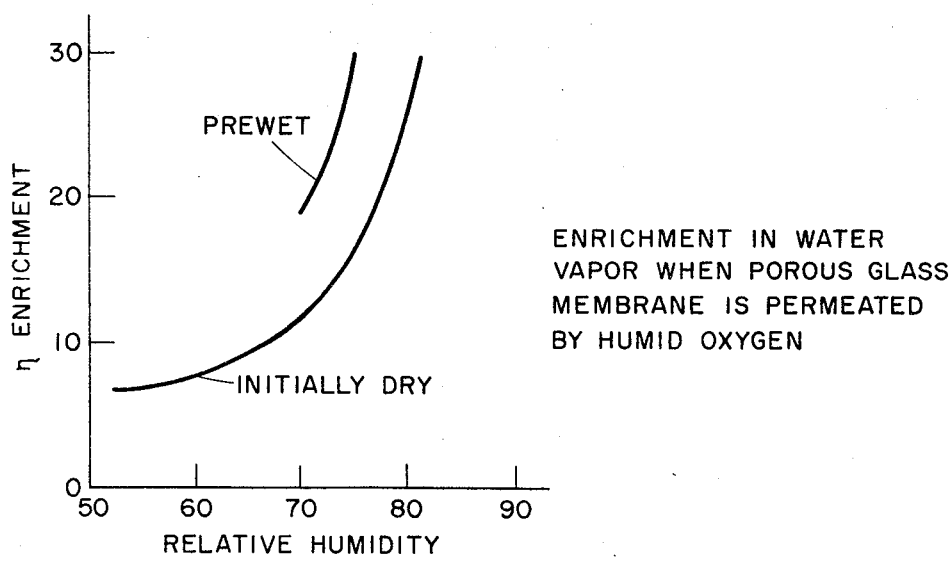
FIG. 3 is plots of water vapor enrichment for increasing relative humidities of the inlet gas for initially dry and prewet membranes.

FIG. 3 is a plot of the relative enrichment in water vapor at the outgoing face of the plug as it varies with the relative humidity of the incoming air. Relative enrichment $\eta$ is defined as $$\eta = \frac{O_2 \text{ in}}{H_2O \text{ in}} \times \frac{H_2O \text{ out}}{O_2 \text{ out}}$$

wherein the quantities are measured as moles, and "in" refers to the ingoing wet gas stream and "out" to the gases permeating the membrane. It should be noted in connection with FIG. 3 that Graham's law of diffusion predicts $\eta$ to be 1.3.

FIG. 3 shows that the permeation of water through the membrane increases with increasing relative humidity. It also shows the marked increase in the proportion of water vapor in the permeate when the membrane is prewetted by dipping in water before testing. This increase brought about by prewetting is due to the fact that evaporation of the condensate from the capillaries occurs at a lower relative partial pressure than condensation into the capillaries.

In a similar manner, membranes in the form of tubes 3 centimeters long and having an outside diameter of 7 millimeters and wall thickness of 1.2 millimeters were evaluated. The tubes were formed of two different porous glasses, the first having a mean pore capillary diameter of 60 Angstrom units and the second of 30 Angstrom units. The data obtained are summarized below in Table 1.

the "wet" gas mixture into gas chamber and for withdrawing the drier gas mixture from it, respectively. A valve-controlled fluid conduit 17 communicates with a vacuum pump (not shown) or with a zone of reduced pressure (e.g., atmosphere around a space vehicle) and serves as a means for withdrawing condensed water vapor from the pores in the porous membrane 14.

Inasmuch as it has been found desirable to prewet the membrane, means are also provided for doing this initially, and periodically thereafter, if desired. Exemplary of such means is conduit 18 within fluid conduit 15. Conduit 18 which terminates in a nozzle 18a and has a valve 19 is connected to a water source. By manually actuating valve 19 at startup or by automatically actuating it through switch means 19a at startup and periodically thereafter, is desired, the degree of membrane wetting may be controlled.

Figure 8:
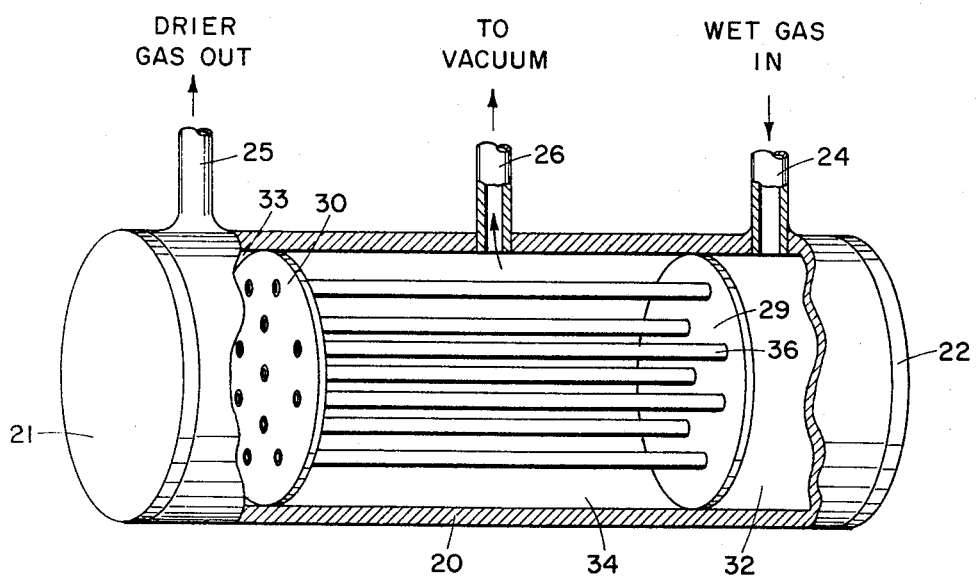
FIG. 8 is a perspective view partly in cross section of another embodiment of an apparatus constructed according to this invention and suitable for installation in the wall of a spacecraft to control the humidity of its cabin.

FIG. 8 illustrates another embodiment of an apparatus constructed in accordance with this invention. This apparatus would be particularly suitable for incorporation in the wall of a spacecraft cabin using the atmosphere surrounding the spacecraft as the means for establishing a pressure differential. In the apparatus of FIG. 8 there is provided a cylindrical housing 20, which is sealed to be fluid-tight by end members 21 and 22. Communicating with the interior of the cylindrical housing is a gas inlet conduit 24, a gas outlet conduit 25, and a suitable connection 26 to a vacuum pump or to a low-pressure zone.

Within the housing two plates 29 and 30 are sealed in spaced relationship to define three distinct fluid volumes, these being the inlet end volume 32, the outlet end volume 33, and the central or permeate volume 34. A plurality of length of porous tubing 36 are mounted between the two plates 29 and 30 and provide fluid channels between volumes 32 and 33. The oxygen-containing gas having a relatively high water vapor content is introduced by inlet line 24 into volume 32; and as it passes through the porous tubing 36, the water is condensed in the tubing capillaries and flows outwardly under the pressure differential into the central volume 34 to be withdrawn through conduit 26. By the time the gas has reached the discharge end of TABLE 1.—PERMEATION OF POROUS GLASS TUBULAR MEMBRANES BY HUMID AIR AT 26 CM. HG TOTAL PRESSURE

| Mean pore diameter in A. | Relative humidity, percent | Flux ($10^6$ ergs./minute) | | | | Enrichment $\eta$ | |
|---|---|---|---|---|---|---|---|
| | | $H_2O$ | | Air | | | |
| | | Dry | Prewet | Dry | Prewet | Dry | Prewet |
| 60 | 79 | 1.1 | | 0.26 | | 54 | |
| 30 | | 2.4 | | <0.05 | | >615 | |
| 60 | 71 | 1.0 | 1.38 | 0.31 | 0.18 | 47 | 111 |
| 30 | | 1.7 | 3.51 | 0.05 | <0.05 | 303 | >1010 |
| 60 | 65 | 0.60 | | 0.40 | | 24 | |
| 30 | | 1.6 | | <0.06 | | >430 | |
| 60 | 63 | 0.64 | 0.79 | 0.36 | 0.28 | 30 | 46 |
| 30 | | 1.5 | | <0.07 | | >345 | |
| 60 | 52 | 0.14 | | 0.40 | | 7 | |
| 30 | | 0.76 | | 0.26 | | 59 | |
| 60 | 50 | | 0.46 | | 0.67 | | 14 |
| 30 | | | 1.2 | | 0.3 | | 83 |

From the data in Table 1, it will be seen that under the test conditions used the porous glass membrane with a mean pore diameter of 30 Angstrom units gave higher permeation rates of water vapor, lower permeation rates of air or oxygen, and a greater proportion of water vapor in the permeate than the glass membrane with a mean pore diameter of 60 Angstrom units. The advantage of prewetting the membrane is also shown in these data.

Figures 6, 7, 9:
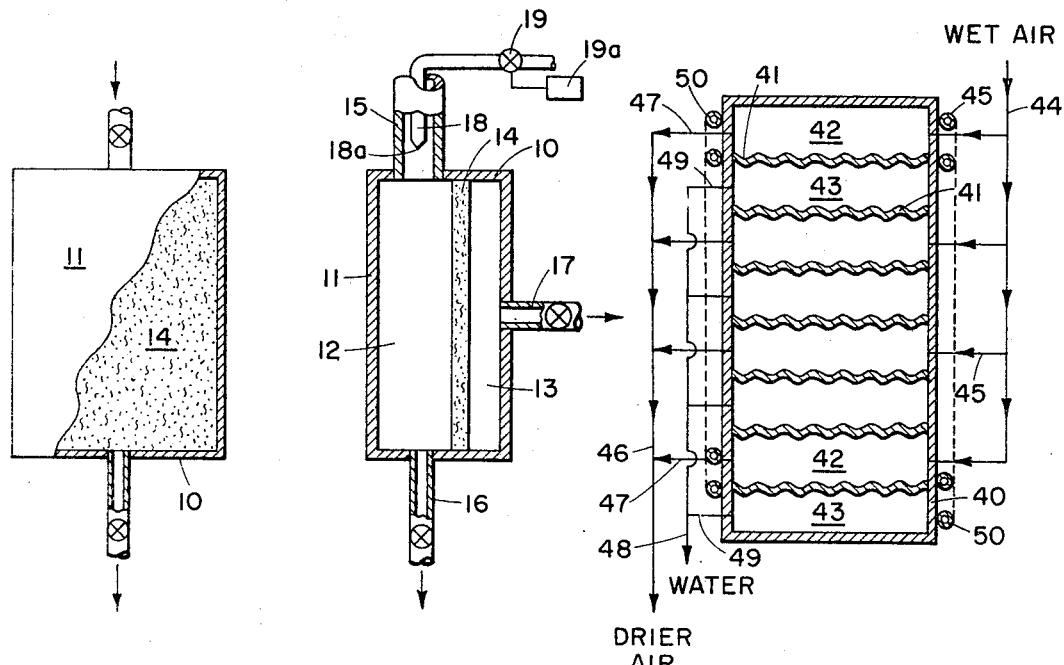
FIGS. 6 and 7 are cross sectional views of one embodiment of an apparatus constructed according to this invention.
FIG. 9 is a cross sectional, somewhat schematic view of another embodiment of the apparatus of this invention illustrating a high-surface, compact device.

FIGS. 6 and 7 are cross sections of one embodiment of the apparatus of this invention, representing it in its simplest form. It is comprised of a fluid-tight housing, formed in this embodiment of a rectangular enclosure 10 with a cover member 11, and a porous membrane 14 which divides the housing volume into a gas chamber 12 and a water vapor or permeate chamber 13. Valve-controlled fluid conduits 15 and 16 provide means for introducing the tubings 36 to enter volume 33, a substantial quantity of the water vapor has been removed, and the drier oxygen-containing gas is withdrawn through outlet 25 to be reintroduced into the cabin atmosphere. Means for prewetting the porous tubing similar to that illustrated in FIG. 7 may be incorporated in the apparatus of FIG. 8.

A device was constructed, as shown in FIG. 8, with 7 tubes made of porous unshrunk glass having a mean pore diameter of 60 Angstrom units. The tubes were 10 centimeters long and had an outside diameter of 7 millimeters and a wall thickness of 1.2 millimeters. Air at atmospheric pressure and at three different relative humidities was introduced through conduit 24 (FIG. 8) into the apparatus at a flow rate of 4 liters per minute. The central volume 34 was maintained at a pressure of about 4 mm. Hg. The device was operated first with tubes which were initially dry and then with tubes which had been pre-wetted. The relative humidity of the "drier" or outgoing air was determined and the loss in humidity calculated. The amount of air which permeated the membrane, as either dissolved or undissolved gas, was also determined. The data obtained on this apparatus are tabulated below in Table 2.

TABLE 2.—PERFORMANCE OF APPARATUS OF FIG. 7

| Initial condition of membrane | Relative humidity of incoming gas, percent | Relative humidity of outgoing gas, percent | Loss of humidity in outgoing gas, percent | Air permeate, liter/min. | Water removed, grams/min. |
|---|---|---|---|---|---|
| Dry | 60 | 47 | 13 | 0.0267 | 0.0112 |
| Wet | 60 | 47 | 13 | 0.0300 | 0.0112 |
| Dry | 70 | 51 | 19 | 0.0267 | 0.0167 |
| Wet | 70 | 52 | 18 | 0.0233 | 0.0233 |
| Dry | 80 | 58 | 22 | 0.0233 | 0.0200 |
| Wet | 80 | 57 | 23 | 0.0217 | 0.0200 |

These performance data show that water vapor permeation rate increases with increasing water vapor concentrations of the incoming gas. The amount of water vapor which can be removed should be materially increased by using membranes having smaller means pore diameters as evidenced by the data of Table 1.

Figure 4:
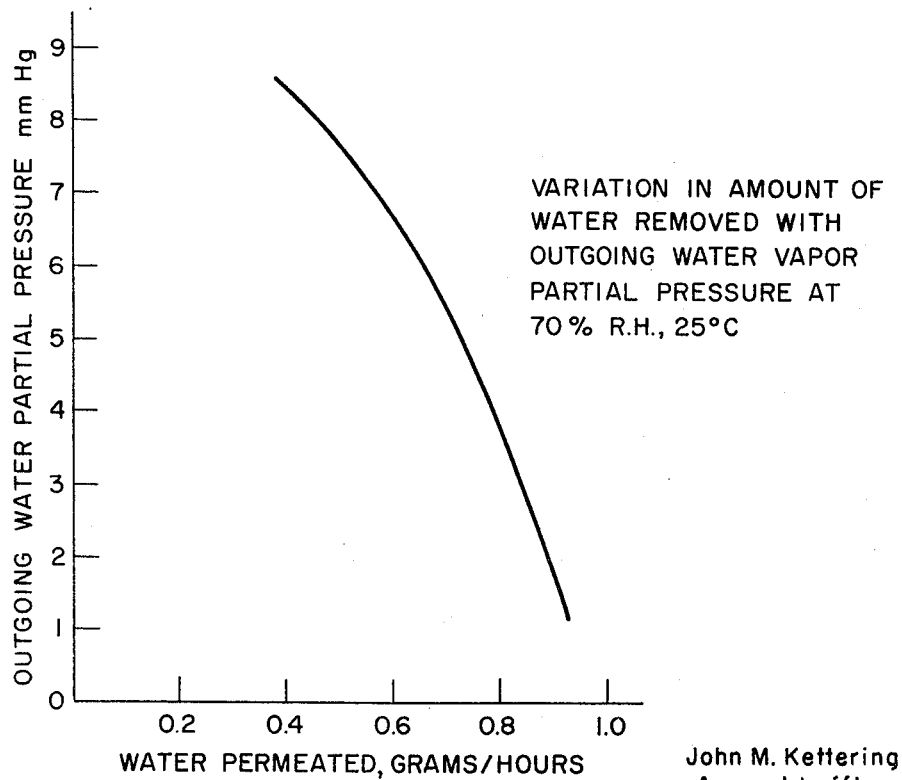
FIG. 4 is a plot of the outgoing water partial pressure vs. the quantity of water permeating the membrane.
Figure 5:
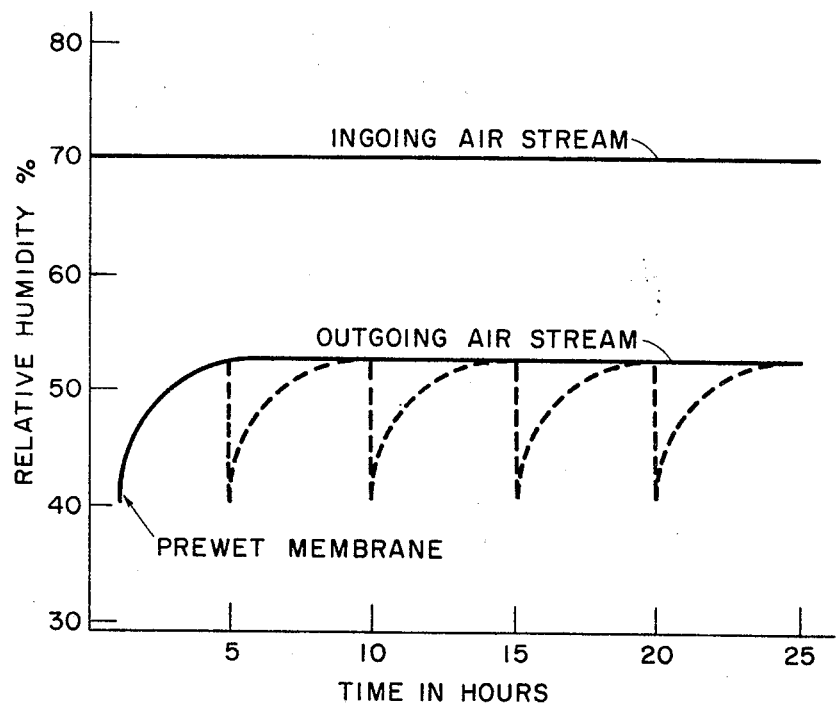
FIG. 5 is a plot of relative humidity in ingoing and outgoing airstreams for an apparatus of this invention.

FIG. 4, which was drawn from data obtained from the apparatus illustrated in FIG. 8, shows that the water vapor permeation rate is a function of the outgoing water vapor partial pressure. FIG. 5 is also a plot of data obtained from the apparatus of FIG. 8. The data of FIG. 5 illustrate that the tubular membranes were capable of removing more water vapor from the airstream when in a completely wetted state, i.e., just after being soaked in liquid water than in an equilibrated state at any given humidity. The performance of the membrane may therefore be enhanced by periodically completely rewetting the membrane by suitable means such as illustrated in FIG. 7. As an example of such enhancement, the dotted lines have been drawn in in FIG. 5 to illustrate the performance of the tubular membranes when completely rewetted every 5 hours. Of course, any period between rewettings may be chosen.

Although it is not necessary to cool the unit, it is possible to improve the performance of a device constructed in accordance with this invention at lower relative humidities by lowering the temperature of the device by 5 to 10° C. so that the relative humidity at the membrane surface is increased. Thus, by lowering the temperature of the apparatus of FIG. 8 from ambient (25° C.) to 20° C. and then to 16° C., significant amounts of water were removed from air which had relative humidities of something less than 65 and 50% at ambient temperatures. The data of Table 3 illustrate the advantage to be gained in reducing the temperatures of the unit by a few degrees.

The membranes 41 divide the volume of the housing into alternating gas chambers 42 and permeate chambers 43. An incoming gas manifold 44 is in fluid communication with the inlet side of each of the gas chambers 42 through branch conduits 45; and in similar manner gas discharge manifold 46 is in fluid communication with the outlet side of each of the gas chambers 42 through branch conduits 47. A permeate or condensate manifold 48 is in fluid communication with each of the permeate chamber 43 through branch conduits 49; and it is adapted, if desired, to be connected to a vacuum pump (not shown). Thus, by incorporating a multiplicity of units within a single housing and by using membranes which present high surface areas, it is possible to construct a very small compact apparatus. Such apparatus lends itself well to cooling, such as by passing a cooling fluid through coils 50 which are placed in heat exchange relationship with the outer wall of the housing.

Thus, it will be seen that the apparatus of this invention may be made to occupy relatively little volume and may operate without any auxiliary equipment such as a refrigerator for condensing the water (although some form of cooling may be used) or a heater for drying a silica gel bed. Since the apparatus operates continuously, it need not be provided in duplicate. Moreover, it operates efficiently at room temperature or slightly below and is capable of making use of the pressure differential, which exist between the pressure in the cabin and the pressure in the atmosphere surrounding the cabin.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:
1. An apparatus for removing water vapor from a gas, comprising in combination
   (a) a fluid-tight housing;
   (b) porous membrane means formed of an inert hydrophilic material positioned within said housing and dividing the volume thereof into gas chamber means and permeate chamber means, the pores in said membrane means having a mean pore diameter of between 3 and 100 Angstrom units with essentially none of said pores having a diameter greater than 100 Angstrom units;
   (c) inlet and outlet fluid conduit means providing fluid communication with said gas chamber means;
   (d) conduit means providing fluid communication with said permeate chamber means;
   (e) means adapted to maintain across said membrane

TABLE 3.—EFFECT OF COOLING APPARATUS

[Incoming gas at 85% RH at apparatus temperature and ambient temperature of 25°C.]

| Unit temp. °C. | Initial condition of membrane | Relative humidity, percent | | | | | Permeate | |
| | | Incoming equiv. ambient | Outgoing gas | | Difference in RH, percent | | | |
| | | | Unit temp. | Equiv. ambient | Unit temp. | Equiv. ambient | H²O, gms./min. | Air, liters/min. |
|---|---|---|---|---|---|---|---|---|
| 20 | Dry | 63 | 61 | 45 | 24 | 18 | 0.020 | 0.0210 |
| 20 | Wet | 63 | 58 | 42.9 | 27 | 20.1 | 0.020 | 0.0227 |
| 16 | Dry | 48.8 | 63 | 36.3 | 22 | 12.5 | 0.0137 | 0.0293 |
| 16 | Wet | 48.8 | 61 | 35 | 24 | 13 | 0.0158 | 0.0237 |

FIG. 9 illustrates in simplified form and in somewhat schematic cross section an embodiment of the apparatus of this invention constructed to achieve maximum use from a given volume or space. This apparatus comprises a fluid-tight housing 40 having within a plurality of porous convuluted membranes 41. This configuration of membrane is designed to provide a relatively large surface area.

means a partial pressure differential of water vapor at the humidity of operation; and
   (f) means for cooling said housing and the interior thereof.

2. An apparatus in accordance with claim 1 wherein said pores in said membrane have a mean pore diameter of between about 20 and about 60 Angstrom units.

3. An apparatus in accordance with claim 1 wherein said porous membrane means is formed of a porous glass.

4. An apparatus in accordance with claim 1 wherein said porous membrane means is formed of a porous pressed carbon.

5. An apparatus in accordance with claim 1 wherein said porous membrane means comprises a thin, flat structure.

6. An apparatus in accordance with claim 1 wherein said porous membrane means comprises at least one tubing member.

7. An apparatus in accordance with claim 1 wherein said porous membrane means comprises a thin convoluted structure.

8. An apparatus in accordance with claim 1 wherein said gas chamber means are two chambers separated by said permeate chamber means.

9. An apparatus in accordance with claim 1 characterized by having a plurality of said gas chamber means and said permeate chamber means in alternating relationship and separated by said porous membrane means.

10. An apparatus in accordance with claim 1 further characterized by having means for introducing liquid water into said gas chamber means thereby to substantially completely wet said porous membrane means.

11. An apparatus for removing water vapor from a gas, comprising in combination
 (a) a fluid-tight housing;
 (b) at least one porous membrane positioned within said housing to define at least one gas chamber and at least one permeate chamber, said membrane having a mean pore diameter of between 3 and 100 Angstrom units;
 (c) fluid conduit inlet and outlet means associated with each of said gas chambers;
 (d) means within at least one of said fluid conduit inlet means adapted to inject liquid water into said gas chamber for deposition on said membrane;
 (e) a permeate withdrawal conduit associated with each of said permeate chambers;
 (f) means to maintain across each of said membranes a partial pressure differential of water vapor at the humidity of operation; and
 (g) means for cooling said housing and the interior thereof.

References Cited

UNITED STATES PATENTS

| | | | |
|---|---|---|---|
| 2,966,235 | 12/1960 | Kammermeyer | 55—16 |
| 3,241,293 | 3/1966 | Pfefferle | 55—16 |
| 3,279,902 | 10/1966 | Gardner | 55—16 |
| 3,303,634 | 2/1967 | Berrian | 55—35 |
| 3,309,843 | 3/1967 | Rigopulos et al. | 55—431 |

OTHER REFERENCES

Melnyk, et al.: The Canadian Mining and Metallurgical Bulletin, "Extraction of Helium From Natural Gas," vol. 54, 10-1961, p. 768.

REUBEN FRIEDMAN, Primary Examiner

C. N. HART, Assistant Examiner

U.S. Cl. X.R.

55—431